Inventor
RICHARD THEILE
By Emery, Holcombe & Blair
Attorney

Inventor
RICHARD THEILE
By Emery, Holcombe & Blair
Attorney

Inventor
RICHARD THEILE
By Emery, Holcombe & Blair
Attorney

March 13, 1956 R. THEILE 2,738,440

TELEVISION PICK-UP TUBES AND TELEVISION TRANSMITTING APPARATUS INCORPORATING THE SAME

Filed Nov. 27, 1951 4 Sheets-Sheet 4

Inventor

RICHARD THEILE

By Emery, Holcombe & Blair

Attorney 2,738,440

TELEVISION PICK-UP TUBES AND TELEVISION TRANSMITTING APPARATUS INCORPORATING THE SAME

Richard Theile, Cambridge, England, assignor to Pye Limited, Cambridge, England, a British company Application November 27, 1951, Serial No. 258,459

Claims priority, application Great Britain December 6, 1950

12 Claims. (Cl. 315—11)

The present invention relates to television pick-up tubes of the storage type and in which the scanning of the storage surface or target is effected by electrons of high velocity, for example, of the order of 1,000 volts. Tubes of this type include those known as iconoscopes and image iconoscopes. Due to the redistribution over the surface of the target of the secondary electrons released by the scanning beam, spurious signals are generated which appear as shading of the background in the television picture and cause the so-called "flare" in the region of the picture towards the end of the scanning of the frame, for example, at the bottom of the picture in the case where the picture is scanned from top to bottom in horizontal lines.

It is believed that this phenomenon of "flare" is caused in the following way. The area of the target on which the scanning beam falls at any instant becomes charged positively by reason of the secondary emission and as the scanning beam moves across the target the secondary electrons released return to and are redistributed over the surface of the target (except for the secondary electrons going to the collector). The area immediately behind the point being scanned at any instant and the areas corresponding to the immediately preceding scanned lines are the most positive areas of the surface and consequently there is a tendency for the secondary electrons to migrate in a direction opposite to the direction of movement of the scanning beam. Therefore, more secondary electrons land on areas which have already been scanned and this explains the usual appearance of the spurious signal which shows the most negative charge at the commencement of scanning (top left-hand corner when the picture is scanned from left to right and from top to bottom) and least negative charge at the bottom of the picture. This more negative charge means a negative signal and the spurious signal appears (in the example considered) as a dark patch in the top left-hand corner, the background becoming brighter in the direction of scanning towards the bottom of the picture. When the scanning beam reaches the bottom of the picture it switches immediately to the top of the picture to recommence the scanning. Therefore there is no region between the bottom of the picture from which secondary electrons will be released and, as a result, the positive charge resulting from the scanning of this bottom area is less neutralised by migration of the redistributed secondary electrons. This bottom area of the picture therefore appears white and also the depth of picture modulation is reduced. This effect is very marked when an area of black picture content reaches the bottom of the frame and this phenomena of flare constitutes one of the most marked defects of high velocity scanned pick-up tubes.

It is the principal object of the present invention to reduce such flare and from one aspect the invention consists in a television pick-up tube of the kind referred to in which means are provided for producing an asymmetric electrostatic field across the storage surface or target and in which means are also provided for distributing over the storage surface a diffuse rain of electrons from a large-area source to bias said surface negatively with respect to the potential of the collector electrode.

From another aspect, the invention consists in a television pick-up tube of the kind referred to in which means are provided for producing an electrostatic field across the storage surface or target which acts in the direction of frame scanning and in which a photo-cathode is disposed in front of the storage surface, said photo-cathode being illuminated by a substantially steady light source to release photo-electrons which are distributed over the storage surface to bias them negatively with respect to the collector electrode.

The rain of electrons may be provided by an auxiliary electron-emitting source, such as a thermionic filament, located in front of the storage surface. Alternatively, the rain of electrons may be produced by secondary action by providing a secondary-emitting surface adjacent and in front of the storage surface with means for causing electrons to impinge on said surface to cause it to emit secondary electrons. In a tube of the image iconoscope type, this may be effected by utilising a part of the photo-cathode of the tube and illuminating it separately to cause it to emit electrons which are themselves caused to impinge upon the layer of secondary-emitting material.

If desired an accelerating field for the secondary electrons may be provided, for example, by holding the collector electrode at a higher potential than the secondary emitting surface.

In a modification, and in order to increase the number of available electrons the secondary-emitting surface may form part of an electron multiplier, which may be associated with an accelerating grid.

In order that the invention may be more clearly understood, reference will now be made to the accompanying drawings which show diagrammatically by way of non-limiting example certain tube arrangements according to its concepts and in which Figure 1 shows a side view of a pick-up tube modified according to this invention, Figure 2 shows a front view of the target assembly.

Figure 1:
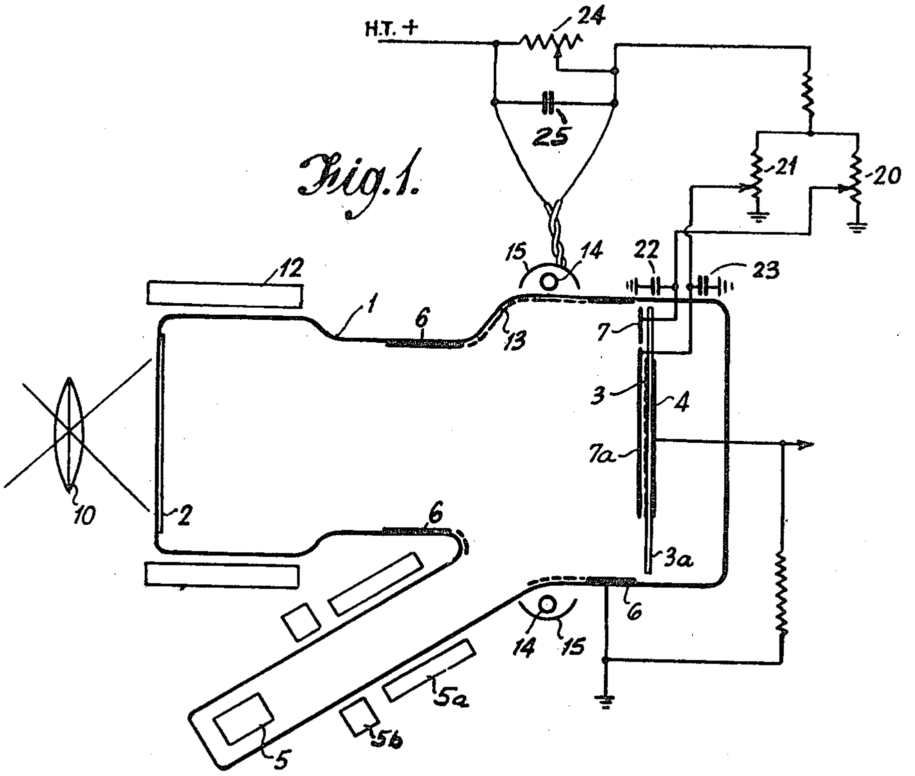
Figure 2:
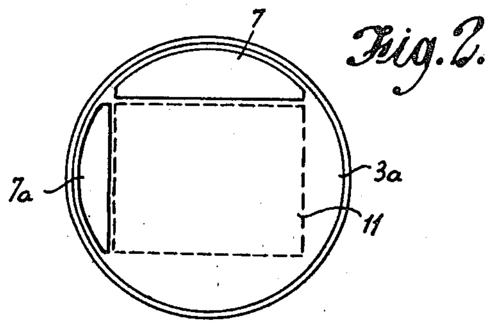
Figure 3:
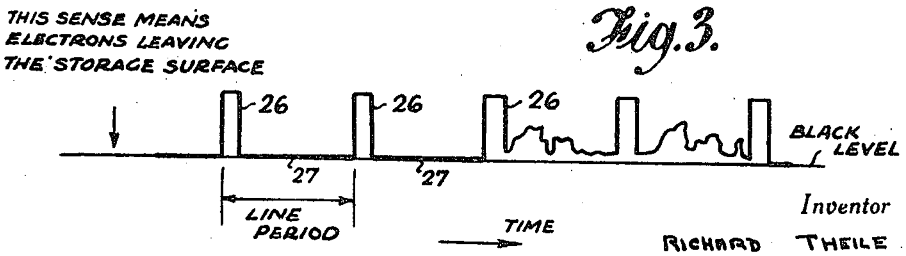
Figure 3 is a waveform diagram.

Referring now more particularly to Figures 1, 2 and 3 of the accompanying drawings, the pick-up tube illustrated is of the image iconoscope type comprising a tube envelope 1 having a photo-cathode 2 on its end wall adapted to be illuminated by the scene to be transmitted through the lens 10. The photo-electrons released from the photo-cathode 2 are focused by means of electron lens 12 on to a target assembly comprising the storage surface 3 on a mica sheet 3*a* backed by a signal plate 4. The target is adapted to be scanned by a high-velocity beam from the electron gun 5, the scanning potentials being applied in accordance with normal practice to the deflection coils 5*a* and 5*b*. The collector electrode of the tube is formed by the coating 6 on the inside of the tube wall, and 7 represents a metal strip carried from the mica sheet 3*a* and disposed slightly in front of the storage surface 3 with its straight edge extending parallel to the line scanning direction and spaced away from that edge of the area on the storage surface which defines the bottom of the picture which is the top of the target assembly in the pick-up tube by reason of the inversion of the picture through the camera lens 10. Another metal strip is indicated at *7a*, which strip is mounted on the target assembly in a manner similar to the metal strip 7 but with its straight edge extending parallel to and spaced away from that edge of the area on the storage surface which defines the ends of the line scans. The disposition of the metal strips 7 and *7a* relative to the picture area 11 is more clearly shown in Figure 2. The strips 7 and *7a* are insulated from one another and connected by leads to terminals external of the tube envelope by which positive biassing potentials may be applied to the strips. A non-uniform field is thus established between the strip electrodes and the collector electrode 6.

In the example of Figure 1, the large-area electron source comprises an additional photo-cathode for producing the rain of low-velocity diffuse photo-electrons on to the storage surface and this additional photo-cathode is constituted by a photo-sensitive wall coating 13 on the inside of the envelope 1 and in front of the storage surface. This photo-cathode is illuminated by a number of small torch lamp bulbs 14 disposed around the outside of the tube and provided with shells or reflectors 15 for directing the illumination on to the photo-sensitised wall coating 13. The bulbs 14 are preferably disposed so as to produce a substantially even illumination of the photo-cathode 13. The photo-cathode 13 is of large area: that is to say, it preferably has an area of the order of even several times greater than the area of the storage plate surface. A large emitting area to the photo-cathode 13 is desirable in order to produce the diffuse electron rain over the total area of the storage surface and also to avoid any space charge limitation since the accelerator electrodes 7 and *7a* are disposed substantially remote from the photo-cathode.

The sensitised layer 13 can be produced by evaporating a suitable material, for example, antimony or silver on to the wall envelope, which material may be subsequently sensitised with cassium. The collector electrode is constituted by a conducting layer in the form of a ring just in front of the storage surface and a conducting layer on the neck portion of the tube envelope, which two parts may be interconnected by conducting strips extending therebetween and also formed by wall coatings, the areas between the strips permitting the photo-cathode to be illuminated by the lamps 14. The conducting strips, being disposed at spaced points around the periphery of the photo-cathode, ensure good electrical connection to this latter.

The tube operates as follows. Due to illumination of the photo-cathode 13, photo-electrons are emitted from the whole area of this annular photo-cathode. The electrodes 7, *7a*, carried by the target assembly are biassed positively and constitute accelerating electrodes for the photo-electrons released from the photo-cathode 13. Therefore, the field in front of the storage surface established by the accelerating electrodes 7 and *7a* and the symmetric photo-cathode is such that the released photo-electrons, although they fall as a rain over the entire storage surface, go with preference to the parts of the storage surface near to the ends of the frame and line scanning directions. The biassing potentials can be so adjusted that the non-uniform distribution of the photo-electrons is such as substantially to compensate for the lack of redistribution of the secondary electrons at those parts. The action of the field itself is supported by the fact that the parts of the storage surface near to the accelerating electrodes 7 and *7a* tend to make an equilibrium potential which is more positive in relation to the other parts of the storage surface. Therefore, more biassing of the photo-electrons are distributed just where they are needed in order to develop a picture storage signal. The electrodes 7 and *7a* being only slightly positive relative to the surrounding parts have no influence on the high velocity electrons imaged on to the storage surface from the photo-cathode 2.

The electrodes 7 and *7a* produce an electrostatic field over the storage surface which acts on the re-distribution of the secondary electrons released by the scanning beam to compensate for the normal non-uniform re-distribution which would be present without them, as described above.

The second electrode *7a* disposed at the end of the line scanning direction corrects the redistribution additionally in the line direction, but with only one electrode 7 in the form of a metal strip at the bottom of the picture and biassed a few volts positively excellent results are obtained, the "flare" being substantially completely suppressed and the black level being substantially constant when a D. C. restorer is used clamped to the interline pulses during the beam blanking time. However, the second electrode *7a* improves the result noticeably in suppressing "flare" at the end of each line scan.

A practical arrangement for deriving the additional biassing voltages and current for the lamps 14 in the camera is illustrated in Fig. 1. The bias voltages for the electrodes 7 and *7a* are derived from voltage dividers 20 and 21 from the camera high tension supply. Preferably, high ohmic voltage dividers are used since thereby substantially no current is drawn and substantially no additional load is imposed on the high tension supply. As the required potential is positive against earth, small filtering condensers 22 and 23 are included which should be non-inductive in character and connected close to the tube terminals in order to avoid high frequency pickup.

The current for illuminating the lamps 14 can conveniently be derived by shunting the lamp leads across a resistor 24 in the high tension supply. A condenser 25 protects the bulbs during switching on and off of the camera supply and also avoids feedback (motor boating).

Figure 3 shows the type of signal generated from a pick-up tube, as so far described. The inter-line pulses 26 are given by the amount of bias photo-electrons falling on to the storage surface and represent a signal corresponding to "white" or "whiter than white" since no electrons are leaving the surface at this time. When there is no picture projected on to the tube, the negative charge of each elementary part of the storage surface is removed by the stabilisation of the storage surface to the equilibrium potential which results in a discharge current signal in the opposite direction to the interline pulses. The first two line periods 27 in Fig. 3 represent this condition. If there is any light in the scene projected on to the tube, the photo-electrons from the photo-cathode 2 discharge the negative charge that is due to the additional photo-electrons rained on to the storage surface from the photo-cathode 13 more or less according to the picture content. Consequently, an area which is white in the scene generates a signal pulse having a level between the black line and the level of the interline pulses 26. It has been found that the amplitude of these interline pulses related to the signal generated during the scanning of the black parts in the picture is substantially the same as in the case of no picture light at all, which means that the black level is substantially constant with changing picture content and the D. C. component of the picture can be evaluated by simply clamping a D. C. restorer to the interline pulses as a reference level. It also means that the level of any part in the picture is not dependent upon the nature of the general picture contents as is the case with the normal types of high velocity scanned pick-up tubes.

If, for example, a camera is exposed to a plain white field and a small black area is brought into the scene, the level of the white background remains substantially constant with a tube according to this invention but changes considerably in the case of a normally constructed pick-up tube by reason of the A. C. character of the picture.

It should be appreciated that various modifications could be made to the specific details shown above. For example, the electrodes 7 and 7a can be made with shapes different from those shown and may alternatively be formed by conducting layers on the target assembly itself. Further, the biassing potential applied to these electrodes need not be constant but may be varied in time, for example, at line or frame frequency.

The arrangement of Fig. 1 but without the lamps 14 produces substantial elimination of "flare" except over the last few scanning lines and in order to reduce the "flare" of these last few lines, the frame flyback may be delayed with respect to the blanking interval in the radiated picture whereby the scanning beam may be caused to scan additional lines at the end of the raster before it is returned to the top of the picture to recommence scanning. These additional lines may be widely spread apart so that a scanning beam will fall upon the surface of the positively charged metal strip to release secondary electrons therefrom which will be re-distributed over the last few lines of the picture area. Alternatively, or in addition, the intensity of the scanning beam may be increased whilst the additional lines are scanned during the delay period.

Figure 4:
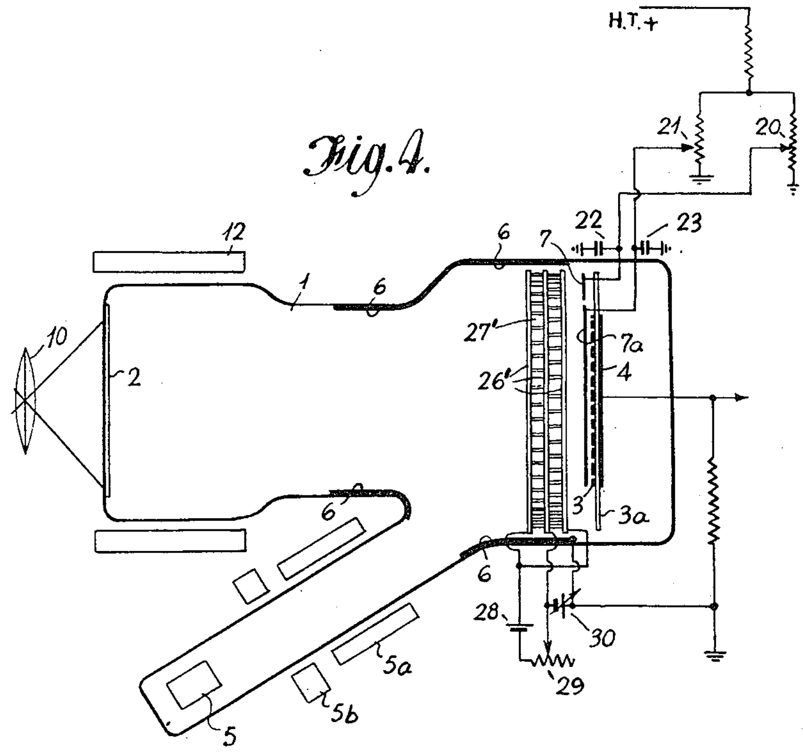
Figure 4 shows a side view of a pick-up tube having an auxiliary electrode to produce a rain of electrons on the target surface.

Figure 4 shows a variation of the tube according to the invention in which a rain of electrons on to the storage surface is provided by means of a thermionic electrode. Similar to the arrangement of Figure 1, the tube comprises an envelope 1, a photo-cathode 2 upon which a scene to be transmitted is focussed by means of the lens 10, an electron lens 12 for focussing the electrons emitted by the photo-cathode 2, a collector electrode 6 in the form of a wall coating on the inside surface of the envelope, a storage surface 3 on a mica sheet 3a associated with a signal plate 4 and the biassing electrodes 7 and 7a. The scanning beam set up by gun 5 is deflected in accordance with usual practice by potentials applied to coils 5a and 5b. The thermionic electrode for producing the rain of electrons comprises a plurality of rings 26′ formed from thin ribbon-like material. Between the three rings 26′ shown, there are provided a number of filamentary wires 27′; two of the rings 26′ are strapped together and connected to one pole of a potential source 28 and the other is connected to the other pole of the source 28 through a variable resistor 29 whereby the assembly may be energised by a variably applied voltage. It will be understood that the strapped rings may be either positive or negative. The assembly can be biassed slightly with respect to the collector electrode 6, for example, by means of a potential source 30 whose voltage is made variable so that the amount and polarity of bias can be adjustable at will. The electrons released by the thermionic electrode assembly are distributed over the surface of the storage target 3 and are accelerated towards it by the potential applied to the electrodes 7, 7a carried by the target assembly for producing an electrostatic field over the storage surface in conjunction with the collector and filament arrangement. It will be understood that the number of rings 26′ need not be three as shown and any number found convenient may be used. For example, only two rings may be used, suitably joined by one row of filamentary wires 27′.

Similarly as in the arrangement of Figure 1, the biassing electrodes 7 and 7a are energised from the H. T. supply source to the camera by means of the voltage divider arrangement 20, 21, safety condensers 22, 23 also being provided as in the previous example.

The arrangement of Figure 4 is thus very similar to that of Figure 1 except that instead of the rain of electrons being provided by means of photo-electrons emitted by the photo-cathode 13, the electrons are produced directly by means of the thermionic electrode assembly 26′, 27′ energised by a suitable source of potential.

Figure 5:
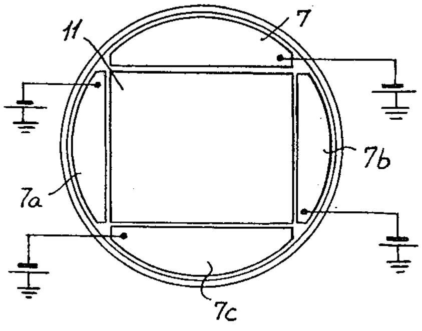
Figure 5 shows diagrammatically a modification of the target assembly.

In the embodiments of Figs. 1 and 4 two biassing electrodes 7 and 7a are shown but if desired more than two such electrodes may be provided, for example, four as shown in Figure 5 in which one additional electrode 7b is arranged at the edge of the picture corresponding to the beginning of the line scanning and another electrode 7c is arranged at the edge of the picture area corresponding to the beginning of the frame scanning. The electrodes 7b and 7c arranged at the edges corresponding to the beginning of the line and/or frame scanning directions should be biassed to values to assist in producing the desired electrostatic field and distribution of the electron rain over the surface of the target and may, if desired, be biassed negatively, as indicated schematically in Figure 5.

In a modification of the arrangement of Figure 4, the thermionic electrode may be a long filament in the form of a ring arranged close to the glass wall and in such manner that the electrons released thereby will be distributed over the surface of the storage plate. Preferably, the filament is arranged near to the collector electrode and it may be biassed with respect to the collector. Means are preferably provided to adjust this bias and also to vary the current flowing through the filament to produce the desired electron emission.

Such a thermionic filament or cathode may, if desired, be subdivided into a plurality of sections, each of which may be individually controlled for producing any desired distribution of the electrons emitted therefrom.

Figures 6, 7:
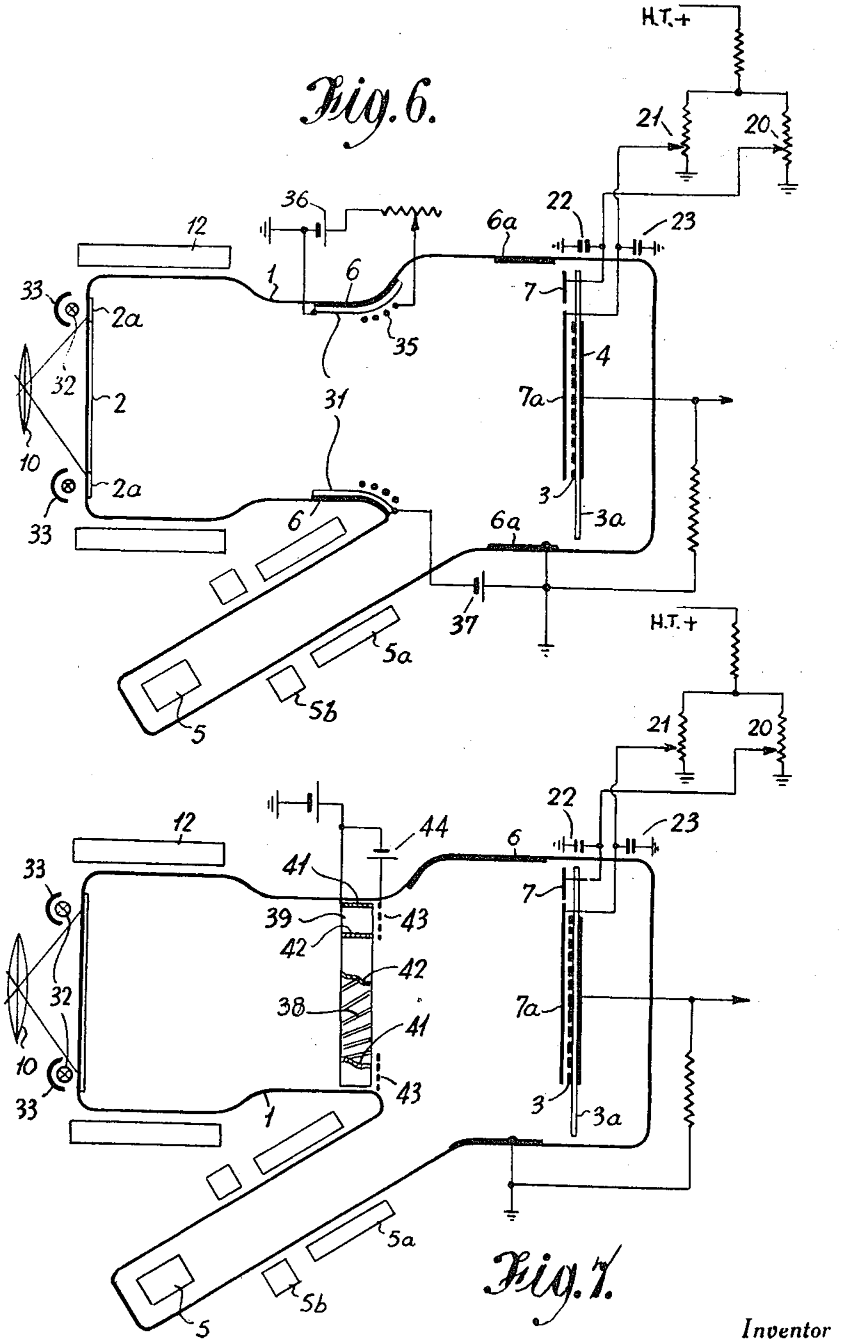
Figure 6 shows a modification of a tube according to the invention incorporating secondary-emissive means.
Figure 7 shows a further modification incorporating an electron multiplier.

A further variation of a tube according to the invention is shown in Figure 6 in which the electron rain for biassing the storage surface 3 is produced by secondary electrons emitted from a secondary-emissive surface irradiated by high-velocity electrons. In the case of a tube of the image-iconoscope type, the tube, in essence, is similar to that shown in the previous figures and, therefore, like reference numerals are employed for like parts. However, in contradistinction to the previous figures, the inner wall of the tube envelope 1 is provided with a coating 31 in front of the storage surface 3 and this coating 31 is secondary emissive. The secondary emissive surface is irradiated with high-velocity electrons by flooding an annular portion 2a of the photo-cathode 2 with light from light sources 32 arranged in reflectors 33. If desired, the light sources may be annular in formation together with annular reflectors. Alternatively, the light sources may comprise a plurality of lamps in a plurality of reflectors. The disposition of the lamps is such that the photo-electrons released thereby will impinge, by reason of the action of the focussing coils 12, upon the secondary-emissive coating 31 on the wall of the tube 1 thereby releasing secondary electrons to fall as a rain on the storage surface 3. Conveniently, the secondary emissive coating 31 may be formed on the inner surface of the wall coating 6 that forms the collector electrode of the tube. The coating 31 must be located such that, the high-velocity electrons emitted by the photo-cathode will impinge thereon.

The secondary electrons emitted by the surface 31 may be accelerated towards the storage surface 3 by means of an accelerating grid 35 placed in such a position between the surface 31 and the target 3 whereby the secondary electrons emitted are accelerated under the influence of the potential of the grid 35 towards the storage surface 3. To indicate the difference in polarity between the grid 35 and the coating 31 a source of potential 36 is shown suitably connected to bring about this effect. If desired, the collector electrode coating 6 may be divided into two portions, the forward mounted portion thereof being held at a higher potential than the main coating 6 connected to the secondary emissive coating 31 and this is illustrated in the drawing by a source of potential 37.

If desired, however, the grid 35 may be omitted and the collector electrode may be continuous and such an arrangement would still produce sufficient secondary electrons to form an electron rain for biassing the storage surface 3.

Figure 7 shows a further variation of the tube according to the invention which is based upon the arrangements of Figure 6 but incorporates an electron multiplier. Basically, the tube is similar to the tubes of the previous figures and it should be understood that like reference numerals again refer to like parts.

In this embodiment of the invention, however, there is no secondary-emitting surface 31 but its place is taken by the electron multiplier diagrammatically illustrated at 38 which is constructed as a dynode consisting of a plurality of radial electrodes 39 in the form of fins arranged in an inclined manner similar to the blades of a turbine (as in the image-orthicon multiplier). As shown more particularly in Figure 8 each fin has its front surfaces 40 coated with secondary-emissive material. In operation, electrons emitted by the annular portion 2*a* of the photo-cathode 2 impinge upon the surfaces 39 whereupon a larger number of secondary electrons is produced which leave the surfaces 39, and which are accelerated by the aid of the electrode 43 towards the storage surface 3, thus providing more electrons compared with those originally emitted by the portion 2*a* of the photo-cathode 2. The fins 39 are held between two concentric ribbon-like strips 41, 42. The accelerator electrode 43 is positioned in front of assembly 38 and is held at a higher potential as shown diagrammatically by the potential source 44.

If desired, the electron multiplier may comprise a fine silver mesh, that is to say, an electron multiplier of the Weiss type.

Figure 8:
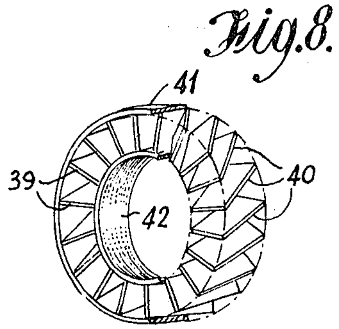
Figure 8 shows a front view of the electron-multiplier dynode used in the arrangement of Figure 7

Preferably, the construction of the dynode is such that none of the primary electrons from the area of the photo-cathode surrounding the picture area can pass through the electrode so that only released secondary electrons can reach the storage surface 3. For this purpose, the turbine wheel construction of dynode as shown in Figures 7 and 8, is preferred to the simple Weiss mesh. The material from which the dynode is constructed is selected to produce the desired secondary emission and may, for example, be made from a silver-magnesium or copper-beryllium alloy.

Figure 9:
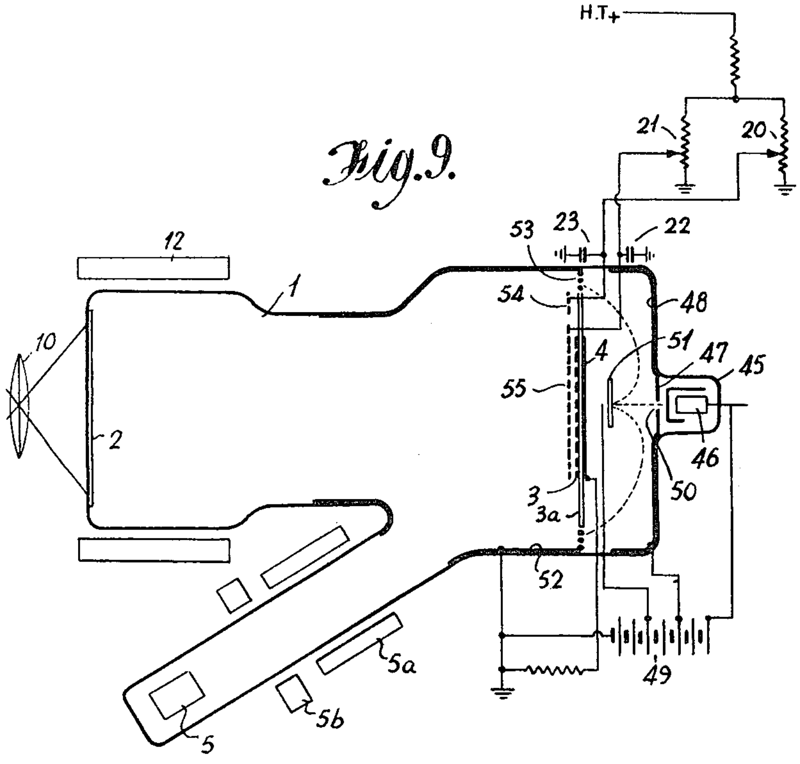
Figure 9 shows a modified form of tube.

Fig. 9 shows a modification of the tube arrangements according to the invention utilising secondary electrons to bias the storage surface. Compared with the preceding drawings, like reference numerals in Fig. 9 refer to similar parts therein, and the tube therefore comprises an envelope 1 containing a photo-cathode 2 upon which an image of the scene to be transmitted is formed by means of the lens 10. An electron lens 12 focusses photo-electrons emitted by the photo-cathode 2 on to a target electrode which comprises a storage surface 3 on a mica backing 3*a* backed, in turn, by the signal plate 4, as in the preceding examples. A side tube contains an electron gun 5, the electrons from which are caused to scan the target electrode in a conventional raster by means of scanning potentials applied to scanning coils 5*a*, 5*b*. Behind the target electrode there is located an electron gun in an extension 45 of the tube, said gun comprising a cathode 46 and a diaphragm 47. The diaphragm 47 is electrically connected to a wall coating 48 in the end of the tube, as shown, and this wall coating, and consequently the diaphragm 47, are held at a potential positive with respect to that of the cathode as shown by the connections to the source of potential 49. The beam of electrons generated by the cathode 46 are, therefore, drawn towards the diaphragm 47 and pass through it owing to the velocity imparted to them through an aperture 50, whereafter they are attracted to the electrode 51 which is held at a potential more positive than that of the diaphragm 47.

This electrode 51 is coated with secondary-emitting material and the electron beam impinging thereupon, as indicated by the dotted lines between the cathode 46 and the surface of electrode 51, causes it to emit secondary electrons from its surface. These electrons commence to travel towards the wall coating 48 owing to their initial velocity after release but since the wall coating 48 is negative with respect to the electrode 51, there is a reflecting field between those two electrodes whereupon the secondary electrons are caused to be turned back or reflected. However, since a large number of them is emitted from the surface of the electrode 51 in a non-orthogonal manner, as indicated by the dotted lines, they do not fall back upon the surface of the electrode 51 but instead are attracted towards a further wall coating 52 beyond the target electrode and which is at a positive potential with respect to the electrode 51, as indicated in the drawing. In order to reach the coating 52, the secondary electrons pass through a coarse screen 53 surrounding the target electrode and which is electrically connected to the wall coating 52 so that it, too, is held at a positive potential with respect to the electrode 51.

The wall coating 52 is also of secondary-emitting material and provides a rain of secondary electrons for biassing the surface of the target electrode.

In order to assist the movement of the secondary electrons from the electrode 51 to the wall coating 52, the planar biassing electrodes 7, 7*a* of the preceding figures are replaced by electron-permeable biassing electrodes 54, 55, in the form of mesh.

It will be understood that more than two biassing electrodes may be provided, if desired.

In a modification of this arrangement, the wall coating 48 is replaced by a diaphragm extending over the transverse dimension of the tube and spaced from the extension 45 of the tube envelope 1. That is to say, in effect the diaphragm 47 is placed further along the longitudinal axis of the electron beam emitted by the cathode 46 and is larger in diameter to touch the tube walls which it meets at the annular wall coating thereon. Also, the screen 53 may be omitted if desired.

It will be understood that the sources of potentials shown throughout the drawings are merely illustrative of desired arrangements since the actual means of applying the potential to the tubes form no part of the present invention.

What I claim is:

1. Television transmitting apparatus comprising a television pick-up tube of the charge-storage type in which scanning of the storage surface is effected by a beam of electrons of high velocity, a strip-like electrode located along each of those edges of the picture area of said storage surface that correspond respectively to the ends of line and frame scanning, a large-area electron source in said tube, means for holding said source at a fixed potential, means for energising said source to produce a rain of low-velocity electrons over the entire surface of said picture area, and means for applying fixed potentials to said strip-like electrodes which potentials are positive with respect to the fixed potential of said electron source.

2. Television transmitting apparatus as claimed in claim 1, in which said large-area electron source comprises a secondary-electron multiplier arrangement located within said tube out of the path of the scanning beam when the tube is energised.

3. Television transmitting apparatus comprising a television pick-up tube of the charge-storage type in which scanning of the storage surface is effected by a beam of electrons of high velocity, a strip-like electrode located along each of those edges of the picture area of said storage surface that correspond respectively to the ends of line and frame scanning, a photo-cathode in said tube, means for holding said photo-cathode at a fixed potential, a substantially steady light source external of said tube and located to illuminate said photo-cathode to release low-velocity electrons therefrom in a rain over the entire surface of said picture area, and means for applying fixed potentials to said strip-like electrodes which potentials are positive with respect to the fixed potential of said electron source.

4. Television transmitting apparatus comprising a television pick-up tube of the charge-storage type in which scanning of the storage surface is effected by a beam of electrons of high velocity, comprising a strip-like electrode located along those edges of the picture area of said storage surface that correspond respectively to the ends of line and frame scanning, at least one further strip-like electrode located along another edge of the picture area of said storage surface, a large-area photo-cathode in said tube, means for holding said photo-cathode at a fixed potential, a substantially steady light source external of said tube and located to illuminate said photo-cathode to release low-velocity electrons therefrom in a rain over the entire surface of said picture area, and means for applying fixed potentials to said strip-like electrodes that are located along those edges of the picture area that correspond respectively to the ends of line and frame scanning, which potentials are positive with respect to the fixed potential of said photo-cathode and which are more positive than any potentials applied to the said at least one further strip-like electrode.

5. A television pick-up tube of the charge-storage type comprising a strip-like electrode located along each of those edges of the picture area of the storage surface that correspond respectively to the ends of line and frame scanning when the tube is energised, a collector electrode, and a large-area electron source located in said tube for irradiation of said charge-storage surface with electrons when energised and connected to said collector electrode.

6. A television pick-up tube as claimed in claim 5, in which said large-area electron source comprises a thermionic filament electron source located to face the scanned side of said charge-storage surface out of the path of the scanning electrons during operation.

7. A television pick-up tube as claimed in claim 5, in which said large-area electron source comprises a secondary-emissive surface.

8. A television pick-up tube as claimed in claim 5, in which said collector electrode comprises a first wall coating of conductive material located near said charge-storage surface, and further comprising a second wall coating of conductive material spaced from said first wall coating and in which said large-area electron source comprises a secondary-emissive surface located over said second wall coating to face said charge-storage surface.

9. A television pick-up tube of the charge-storage type comprising a strip-like electrode located along each of those edges of the picture area of the storage surface that correspond respectively to the ends of line and frame scanning when the tube is energised, a collector electrode, and a photo-cathode located in said tube for irradiation of said charge-storage surface with electrons when energised, and connected to said collector electrode.

10. A television pick-up tube of the image iconoscope type comprising a collector electrode located in said tube between the image photo-cathode and the charge-storage surface, a strip-like electrode located along each of those edges of the picture area of said storage surface that corresponds respectively to the ends of line and frame scanning when the tube is energised, and a photo-cathode in said tube also located between said image photo-cathode and said charge-storage surface and connected to said collector electrode.

11. A television pick-up tube of the charge-storage type comprising an evacuated glass envelope, a constriction near the mid-part of said enevelope forming a shoulder facing towards the charge-storage surface of the tube, a strip-like electrode located along each of those edges of the picture area of said charge-storage surface that correspond respectively to the ends of line and frame scanning when said tube is energised, a photo-cathode located on said shoulder, a collector electrode within said tube between said charge-storage surface and the other end of said tube, and connection means between said photo-cathode and said collector electrode.

12. A television pick-up tube of the charge-storage type comprising a strip-like electrode located along each of those edges of the picture area of the charge-storage surface that correspond respectively to the ends of line and frame scanning when the tube is energised, a first annular wall coating of conductive material within said tube near said charge-storage surface, a second annular wall coating of conductive material within said tube and spaced from said first wall coating, connection means between said first and second wall coatings and a photo-cathode between said wall coatings and located for irradiation of said charge-storage surface with electrons when energised and connected to said wall coatings.

References Cited in the file of this patent

UNITED STATES PATENTS

| | | |
|---|---|---|
| 2,131,892 | Iams | Oct. 4, 1938 |
| 2,324,534 | Pierce | July 20, 1943 |
| 2,368,884 | Schade | Feb. 6, 1945 |
| 2,451,005 | Weimer et al. | Oct. 12, 1948 |
| 2,579,971 | Schade | Dec. 25, 1951 |
| 2,622,226 | Theile | Dec. 16, 1952 |